United States Patent
Peskos et al.

(10) Patent No.: US 10,690,421 B2
(45) Date of Patent: Jun. 23, 2020

(54) HEAT EXCHANGER AND METHOD OF COOLING A FLOW OF HEATED AIR

(71) Applicant: Modine Manufacturing Company, Racine, WI (US)

(72) Inventors: Thomas Peskos, Otisheim (DE); Rainer Glueck, Tuebingen (DE); Frank Lippke, Filderstadt (DE)

(73) Assignee: MODINE MANUFACTURING COMPANY, Racine, WI (US)

( * ) Notice: Subject to any disclaimer, the term of this patent is extended or adjusted under 35 U.S.C. 154(b) by 0 days.

(21) Appl. No.: 15/880,624

(22) Filed: Jan. 26, 2018

(65) Prior Publication Data

US 2018/0149433 A1 May 31, 2018

Related U.S. Application Data

(63) Continuation-in-part of application No. 14/388,664, filed as application No. PCT/US2013/034494 on Mar. 28, 2013, now Pat. No. 9,909,812.

(30) Foreign Application Priority Data

Mar. 28, 2012 (DE) .......................... 10 2012 006 346

(51) Int. Cl.
F28F 3/00 (2006.01)
F28F 3/08 (2006.01)
(Continued)

(52) U.S. Cl.
CPC ........ F28D 9/0068 (2013.01); F02B 29/0462 (2013.01); F28D 9/0056 (2013.01);
(Continued)

(58) Field of Classification Search
CPC .... F28D 9/0031; F28D 9/0062; F28D 9/0068; F28F 9/00; F28F 9/0282; F28F 2250/06
(Continued)

(56) References Cited

U.S. PATENT DOCUMENTS

| 5,062,477 | A | | 11/1991 | Kadle |
| 5,400,854 | A | * | 3/1995 | Iio .......................... F28D 9/0043 165/157 |

(Continued)

FOREIGN PATENT DOCUMENTS

| DE | 19646349 B4 | 5/1998 |
| DE | 102007009535 A1 | 9/2007 |

(Continued)

OTHER PUBLICATIONS

Translation of Japanese Patent Document JP 61027496 B entitled Translation-JP 61027496 B (Year: 2019).*

(Continued)

Primary Examiner — Paul Alvare
(74) Attorney, Agent, or Firm — Michael Best & Friedrich LLP; Jeroen Valensa; Michael Bergnach

(57) ABSTRACT

A heat exchanger is constructed from a plurality of plate pairs stacked to form air flow passages between adjacent ones of the plurality of plate pairs and cooling fluid flow paths within each of the plurality of plate pairs. The cooling fluid flow paths have a first portion along one longitudinal edge of each plate pair, a second portion along an opposing longitudinal edge each plate pair, a third portion extending through the heat exchange section between the first and second portions, and a fourth portion extending between the first and second portions along one lateral edge of each plate pair and bypassing the third portion. Flow barriers are arranged within each plate pair to at least partially define the third and fourth portions.

18 Claims, 9 Drawing Sheets

(51) Int. Cl.
*F28D 1/02* (2006.01)
*F28F 3/14* (2006.01)
*F28D 9/00* (2006.01)
*F28F 3/02* (2006.01)
*F02B 29/04* (2006.01)
*F28D 21/00* (2006.01)
*F28F 9/02* (2006.01)

(52) U.S. Cl.
CPC ............ *F28D 9/0075* (2013.01); *F28F 3/027* (2013.01); *F28D 9/0031* (2013.01); *F28D 9/0062* (2013.01); *F28D 2021/0082* (2013.01); *F28F 9/0282* (2013.01); *F28F 2250/06* (2013.01)

(58) Field of Classification Search
USPC .................................. 165/153, 166, 167, 170
See application file for complete search history.

(56) References Cited

U.S. PATENT DOCUMENTS

| | | | |
|---|---|---|---|
| 5,810,077 | A | 9/1998 | Nakamura et al. |
| 5,875,838 | A | 3/1999 | Haselden |
| 5,983,992 | A | 11/1999 | Child et al. |
| 8,016,025 | B2 | 9/2011 | Brost et al. |
| 8,596,339 | B2* | 12/2013 | Palanchon ............ F28D 9/0031 165/103 |
| 8,985,198 | B2 | 3/2015 | Braun et al. |
| 2001/0054499 | A1 | 12/2001 | Claude et al. |
| 2006/0249281 | A1 | 11/2006 | Park et al. |
| 2007/0074859 | A1 | 5/2007 | Nakada |
| 2007/0261815 | A1* | 11/2007 | Melby ................. F02B 29/0462 165/41 |
| 2008/0066893 | A1* | 3/2008 | Oh ........................ F28D 1/0341 165/153 |
| 2008/0087410 | A1 | 4/2008 | Muller-Luft et al. |
| 2008/0141985 | A1* | 6/2008 | Schernecker .......... F02M 26/25 123/568.12 |
| 2008/0149318 | A1 | 6/2008 | Dakhoul |
| 2009/0014153 | A1 | 1/2009 | Pimentel et al. |
| 2010/0084120 | A1 | 4/2010 | Yin et al. |
| 2010/0300647 | A1 | 12/2010 | Steurer et al. |
| 2011/0247790 | A1 | 10/2011 | Holm et al. |
| 2012/0227438 | A1 | 9/2012 | Ito et al. |
| 2015/0068717 | A1 | 3/2015 | Gluck |

FOREIGN PATENT DOCUMENTS

| | | |
|---|---|---|
| DE | 102006048667 A1 | 4/2008 |
| DE | 102012006346 A1 | 10/2013 |
| EP | 1830048 A1 | 9/2007 |
| JP | 6127496 A | 2/1986 |
| JP | 61027496 B * | 6/1986 |
| JP | 06257982 A | 9/1994 |
| JP | 3145589 A2 | 6/1996 |
| JP | 2011149671 A2 | 8/2011 |
| WO | 9964805 A1 | 12/1999 |

OTHER PUBLICATIONS

European Patent Office, Search Report and Opinion for Application No. 18211108.8 dated Jul. 1, 2019 (7 pages).

Korean Intellectual Property Office, Notice of Preliminary Rejection for Application No. 10-2014-7027013 dated Mar. 14, 2019 (5 pages).

* cited by examiner

HEAT EXCHANGER AND METHOD OF COOLING A FLOW OF HEATED AIR

CROSS-REFERENCE TO RELATED APPLICATIONS

This application is a Continuation-In-Part of U.S. patent application Ser. No. 14/388,664, which has a 371(c) date of Sep. 26, 2014, and is a 35 U.S.C. § 371 National Stage Entry of PCT/US2013/034494, filed on Mar. 28, 2013, which claims priority to German Patent Application No. DE102012006346.6, filed Mar. 28, 2012, the entire contents of all of which are hereby incorporated by referenced herein.

BACKGROUND

The present invention relates to a heat exchanger.

SUMMARY

The invention relates to a heat exchanger, for example an indirect air cooler, in which the air, for example compressed charge air for an internal combustion engine, is cooled, for example, by means of a fluid, wherein the heat exchanger is constructed from stacked pairs of plates with fins arranged therebetween, and the stack is arranged in a housing to which the air flows, flows through the fins and flows out, wherein said air is cooled by the fluid flowing in the plate pairs, which fluid is conducted into the plate pairs via at least one inlet and conducted away via at least one outlet, wherein the inlet and the outlet are located at a common edge of the plates and the air flows through the fins approximately in the direction of this edge.

Charge air coolers which are installed in motor vehicles and serve to cool the charge air by means of a cooling fluid are often referred to as indirect air coolers, in contrast to direct air coolers, a term used when the exemplary charge air is cooled with ambient air which is conveyed through the cooler by means of a fan.

The cooling fluid used is cooled directly by means of cooling air and is then used for cooling the engine as well as for other cooling purposes, and recently also to a greater extent for (indirect) charge air cooling.

The efficiency of the transmission of heat is known to be highest if the media are conducted through the heat exchanger in countercurrent (DE 29 809 080 U1). However, a throughflow in countercurrent is not always possible depending on the locality in which the air cooler (heat exchanger) is located and on other restrictions. The positions of the inlets and outlets can actually rarely be defined in such a way that the preferred throughflow can also occur or the actualization thereof often requires excessively high complexity in terms of design and construction.

For this reason, sometimes what is referred to as countercurrent or often cross-countercurrent is selected in which, for example, at least one of the media describes a meandering path. An example of cross-countercurrent can be found in DE 10 2006 048 667 A1.

The object of the invention is to construct the described heat exchanger with simple structural features, that is to say features which are also manufacture-friendly, in such a way that said heat exchanger provides a relatively high level of efficiency.

According to one particular aspect of the invention there is provision that the fluid can be conducted in an inlet region and/or outlet region of the plate pairs in at least one flow path approximately parallel to the air flow direction and/or of the common edge, flows further through at least a first duct approximately in cross current with respect to the air, and passes through the plate pairs over the largest heat exchange area of the plate pairs, substantially approximately in countercurrent with respect to the air, in order to flow through at least one second duct, approximately in cross current, back to the outlet.

There is preferably at least one inlet-side flow path and the inlet-side first duct as well as the at least one outlet-side second duct and also outlet-side flow path. In both flow paths, the preferred fluid flows approximately in the direction of the air. The lengths of the flow paths can be minimized by arrangement of the inlets and outlets at the corners of the plates. According to the present invention the entire mass flow of the fluid does not pass over the entire length of the ducts but instead a considerable portion thereof does. Shortly after the entry of the fluid into the at least one first duct, a partial flow already flows through the plate pairs in countercurrent with respect to the air via corrugated internal fins. The same applies to the at least one second duct which leads to the outlet-side flow path. The ducts have a relatively low flow resistance so that the regions of the plates which are remote from the outlet are also sufficiently involved in the exchange of heat. The cross-sectional geometry of the ducts can be of corresponding design so that sufficient involvement is achieved.

The largest heat-exchanging region of the plates is equipped with the corrugated internal fins. The corrugated internal fins can be embodied as lanced and offset fins, such as are used, for example, in the field of oil cooling and elsewhere. In such fins, parts of the corrugation edges are arranged offset alternately to the right and to the left. Breakthroughs or cutouts are present between the offset parts. They permit a throughflow in the longitudinal direction. If this direction is blocked, a throughflow in the lateral direction is also possible. The longitudinal direction is parallel to the direction of the corrugation edges here. The internal fins in the plate pairs have a significantly smaller pressure loss than in the lateral direction when throughflow occurs in the longitudinal direction.

The direction in which the corrugations of the corrugated internal fins run is preferably provided transversely with respect to the longitudinal direction of the plates so that the fluid can flow in the longitudinal direction with relatively little resistance along the offset corrugation edges. A significantly larger flow resistance is present in the direction in which the corrugations run, a direction which, as mentioned above, is located transversely with respect to the direction of the corrugation edges because the fluid must flow through the numerous breakthroughs or cutouts in the corrugation edges and in the process also experiences numerous changes in the direction of flow. Approximately the entire mass flow flows through one flow path which is formed near to the inlet and the outlet by means of a flow barrier. In the flow path, the fluid flows in countercurrent with exemplary air since the flow barrier is arranged approximately parallel to the lateral edges. This can be accepted because the proportion of the entire heat-exchanging area taken up by the portion of the inlet and outlet region including the flow paths in terms of area is very small. It is generally not significantly more than approximately 15%, with 3 to 12% being preferred. The flow barrier is also located relatively close to the one lateral edge of the plate pairs, which is referred to above as the common edge. At the ends of the flow barrier located opposite there is a hydraulic connection to the ducts. At the other lateral edge of the plate pairs there is preferably no such flow path or duct so that the fluid cannot escape or is forced to take the path through the internal fin which has greater pressure loss and is located in countercurrent with respect to the airflow.

Simulation calculations carried out by the Applicant have resulted in a significant increase in the heat exchange rate for the proposed heat exchanger compared to the prior art.

The invention will be described in exemplary embodiments with reference to the appended drawings. Further features of the invention can be found in the following description, said features being either contained in the dependent claims or may prove to be significant later.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In the perspective illustration (FIG. 1) of the heat exchanger, which is an indirect air cooler in the exemplary embodiment, the inlet 4 and the outlet 5 are located at the right-hand edges of metallic plates 1, which therefore represent the "common" edges E here. The inlet 4 is arranged at the end remote from the air inflow side AAir of the heat exchanger. The outlet 5 is, on the other hand, located closer to the inflow side of the charge air which is indicated by three block arrows. The inlet and outlet connectors have the reference symbols 40 and 50. The inlet and outlet cross sections have a circular shape in these embodiments. Instead of charge air, a mixture of charge air and exhaust gas or pure exhaust of an internal combustion engine (not shown) can also be present.

An advantage of the invention worth mentioning is that the inlet 4 and the outlet 5 can be located on opposite edges which would then constitute the "common" edges E, without changing the throughflow, as a result of which structural restrictions can be coped with better than hitherto. In the exemplary embodiment shown, these edges E are the lateral edges of the plates 1. Two parallel longitudinal edges of the plates 1 are located approximately perpendicularly on the lateral edges, wherein the terms are used merely to differentiate between the edges, but do not in any case mean that the longitudinal edges, as shown in the exemplary embodiment, are longer than the lateral edges. The edges can all have the same length. The lateral edges can also be longer than the longitudinal edges. The fact that the edges in the exemplary embodiment shown are straight and therefore approximately rectangular plates 1 are present is also not an important precondition for solving the stated problem. The edges can also be arcuate or embodied in some other way which deviates from a straight line.

Figure 1:
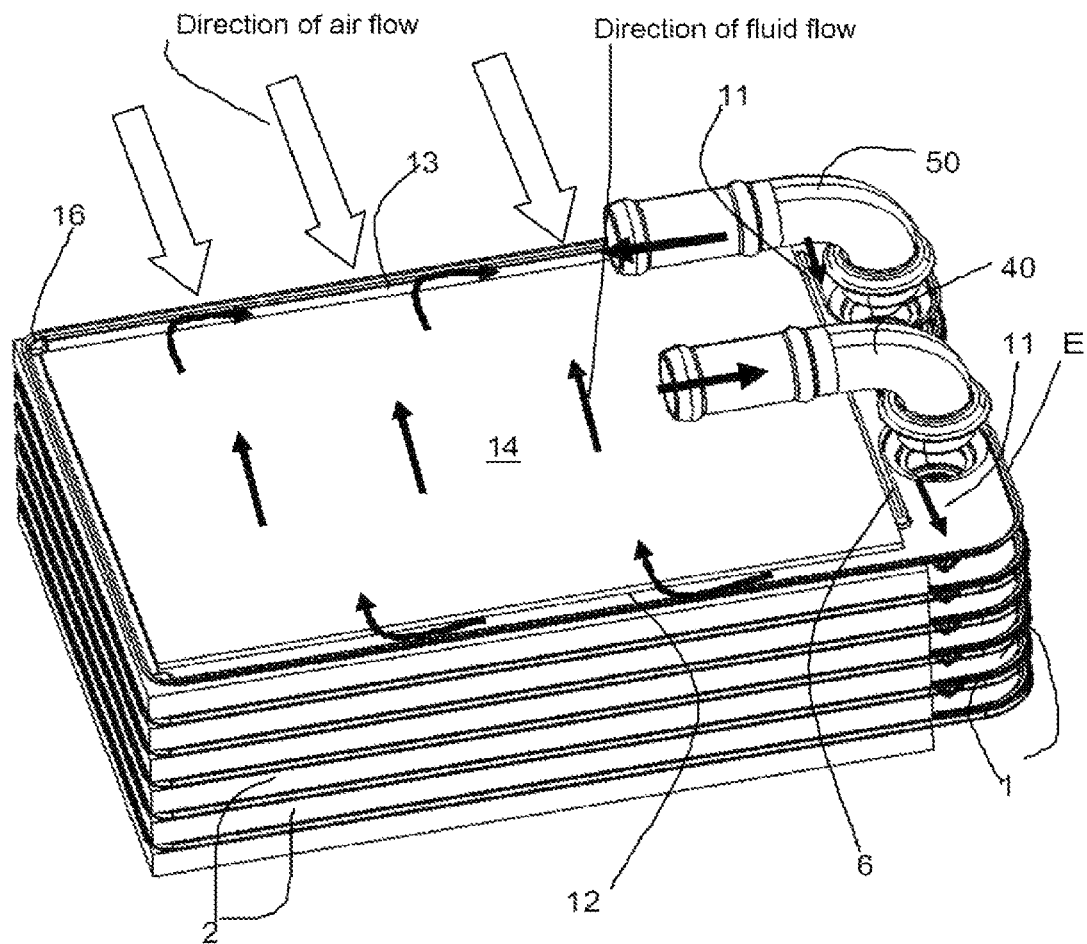
FIG. 1 shows a perspective view of a heat exchanger according to an embodiment of the invention (illustrated without a housing).

In the exemplary embodiment shown, the plates 1 have a cutout 8 at the common edge E which is the right-hand lateral edge in FIG. 1. The depth of the cutout 8 is somewhat smaller than the depth of the inlet and outlet region 10. The position of the inlets and outlets 4, 5 is situated approximately in the center between the central longitudinal axis 15 of the plates 1 and their longitudinal edges. The inlet-side flow paths 11 extend from the inlets to the first ducts 12, which are arranged in the inner edge region of the one longitudinal edge in the plate pairs 1a, 1b. In the inner edge region of the other longitudinal edge there is the at least one second duct 13 which leads to the outlet-side flow path 11 and further to the outlet 5.

In the exemplary embodiment shown, the ducts 12, 13 have the same cross section throughout. The ducts 12, 13 have a low flow resistance, that is to say at least a partial cross section of the ducts 12, 13 does not have flow impediments or the like. Since, as mentioned, approximately rectangular plates are present in the exemplary embodiment shown, the flow paths 11 and the ducts 12, 13 are also located approximately perpendicularly with respect to one another.

In some embodiments (not shown), the inlets and outlets 4, 5 are also arranged at a common edge E but in the vicinity of the corners of the plates 1 here, with the result that the lengths of the flow paths 11 becomes virtually zero. In other words, fluid can enter virtually directly into the first ducts 12 and virtually directly enter the outlets 5 from the second ducts 13. There would also be no reason, in at least some embodiments, not to arrange the inlets 4 in the corners and merely to position the outlets 5 approximately as shown, or vice versa. As a result, only significantly pronounced outlet-side flow paths 11 would be present in such embodiments while the length of the inlet-side flow paths 11 would approach zero, that is to say would be virtually invisible. The designer therefore has multiple options available for adapting the heat exchanger to restrictions forced on him by the installation location, without having to accept a loss of power.

Figure 4:
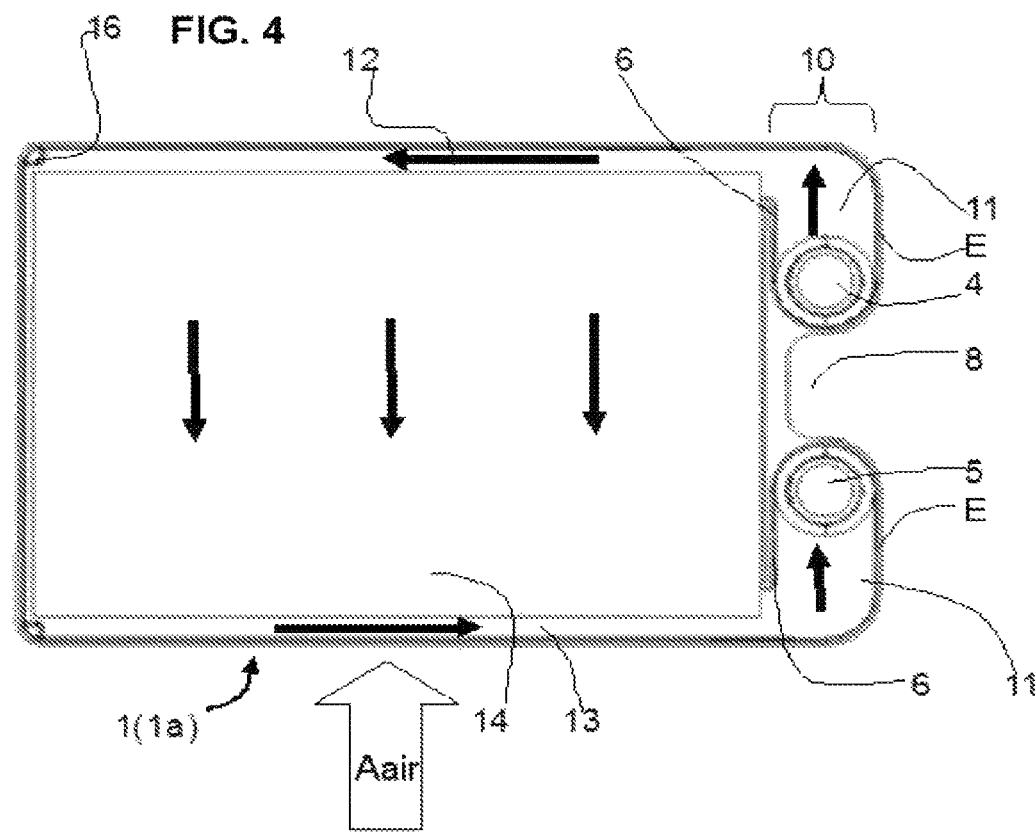
FIGS. 4 and 5 show two plates which form a plate pair.
Figure 5:
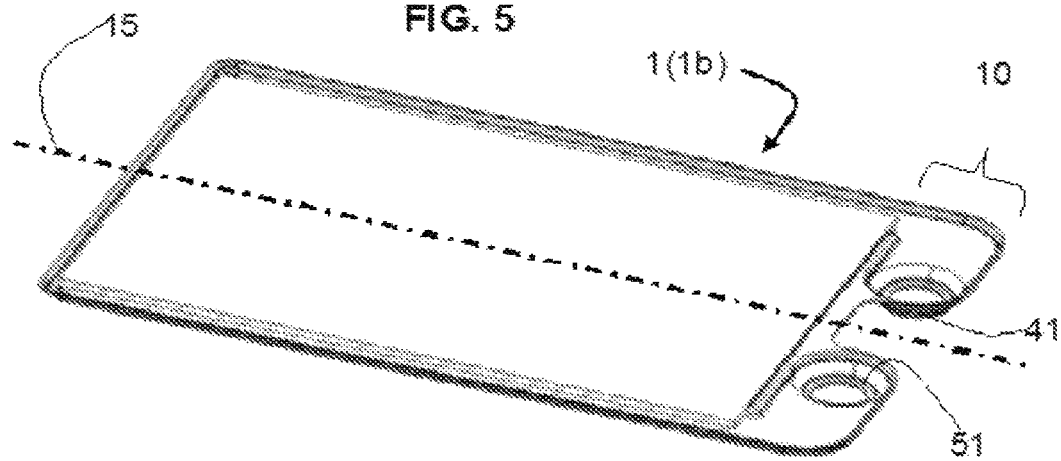

The flow paths 11 can be implemented by construction of beads in the plates 1 forming the pairs, as is apparent from the illustrations according to FIGS. 4 and 5. Instead of beads, rods which are inserted and soldered in the plate pairs can also be provided. In the exemplary embodiment shown, the beads or the rods form the flow barriers 6 mentioned above. These figures show plan views of the two plates 1 which form a plate pair 1a, 1b, with an internal fin 14 which is inserted therein, but is not illustrated in detail here.

The plate 1b shown in FIG. 5 is rotated through 180° about its longitudinal axis 15 and is positioned on the plate 1*a* in FIG. 4. The two beads come to bear one against the other in the plate pair 1*a*, 1*b* and are connected later. They accordingly have a height which is approximately half as large as the distance between the two plates 1 which form the plate pair 1*a*, 1*b*. The height of the internal fin 14 must correspond to this distance. In addition, the plates 1*a* and 1*b* come to bear one against the other with their edges and are connected to one another in a sealed fashion. In the exemplary embodiment they are bent-over edges.

Various other edge configurations are known from the prior art. These can alternatively be provided.

The inlet and outlet openings 4, 5 of the plate pair 1*a*, 1*b* are provided with collars 41, 51 which protrude upward at the upper plate 1*a* and downward at the lower plate 1*b*. The connection to the adjacent plate pairs 1*a*, 1*b* takes place at these collars. Sealing rings which are located between the plate pairs and connect the latter are also an alternative to such collars 41, 51. In embodiments which are not shown just one of the plates 1 has a bead whose height has to be correspondingly larger, that is to say which should correspond to the height of the internal fin 14. Of course, the entire stack, that is to say the plate pairs and the fins 2 located therebetween, are connected to one another, preferably connected metallically, for example soldered in a soldering oven. The soldered-in internal fin 14 through which the fluid flows is located within each plate pair 1*a*, 1*b*.

Since the aforementioned internal fin 14 can have a smaller dimension than the plate 1 in which it is inserted owing to construction of the ducts 12, 13, the position of the internal fin 14 is indeterminate, which is disadvantageous. A correct position of the internal fin 14 within the plate 1 can be implemented by virtue of the fact that inwardly protruding knobs or similar shaped elements 16 are formed in the corners of the plates 1 and serve as a stop for the internal fin 14. As a result, the preassembly of the heat exchanger improves. With this measure it is also possible to prevent an undesired bypass for the fluid, or at least largely suppress it. However, in some embodiments such a bypass may be desirable, as described in greater detail hereafter.

Figure 3:
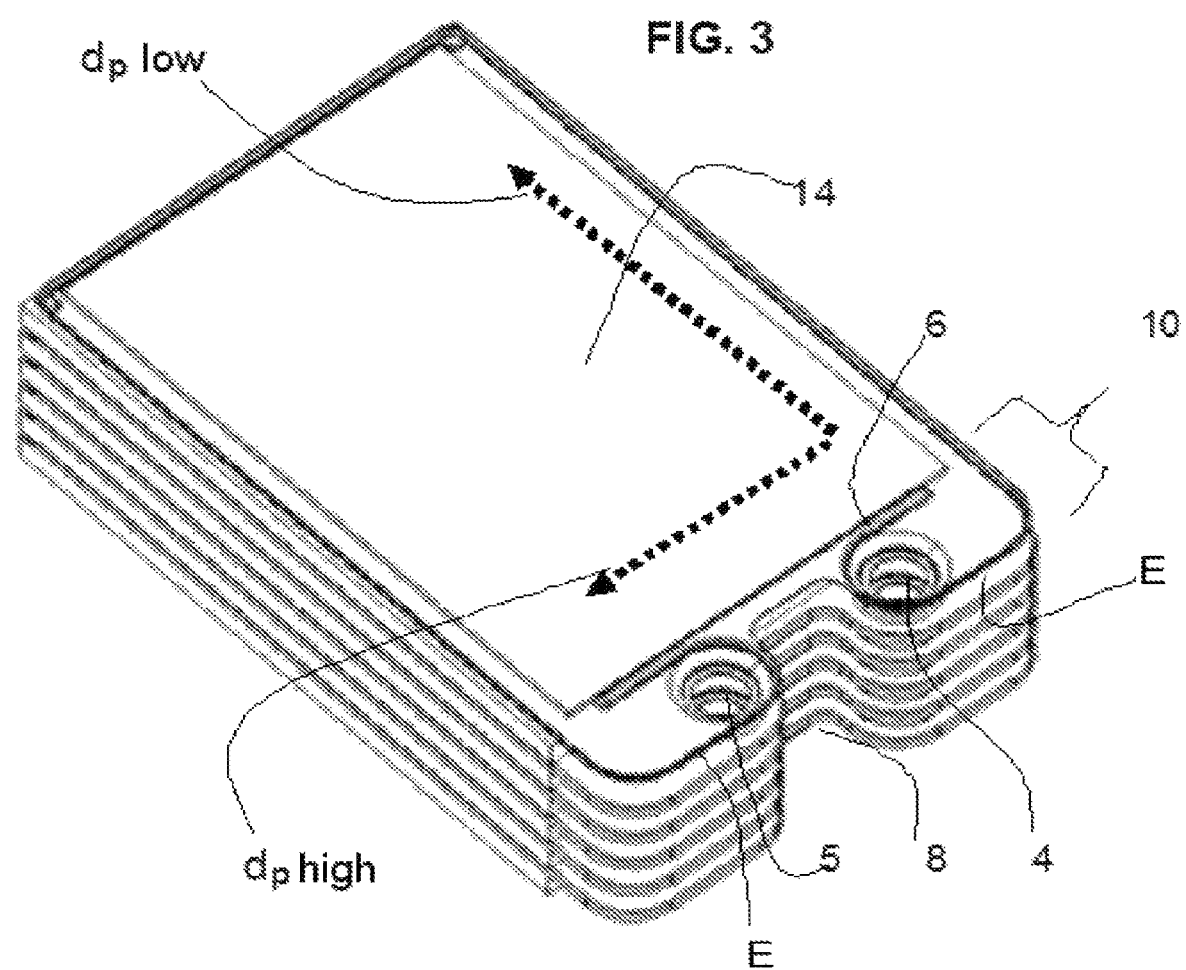
FIG. 3 shows a stack made of plates and fins in which the one plate of the upper plate pair has been removed in order to make the interior of this plate pair visible.

In FIGS. 3, 4 and 5, the inlet and outlet region which has already been mentioned is provided with the reference symbol 10. It makes up approximately 12% of the entire heat-exchanging area here. Since this region for exchanging heat cannot contribute very much, the aim is to make it as small as possible. In FIG. 3, two arrows indicate that the corrugated internal fin 14 is preferably inserted into the plate pair 1*a*, 1*b* in such a way that when there is a flow through them in the longitudinal direction a significantly lower pressure loss dp occurs than when there is a throughflow in the lateral direction. The fluid is forced by the special design to take the path in the lateral direction and accordingly to flow though the plate pairs 1*a*, 1*b* in countercurrent with respect to the direction of the flow of air.

The heat exchanger thereby provides multiple cooling fluid flow paths extending hydraulically in parallel with one another between the inlet 4 for the cooling fluid and the outlet 5 for the cooling fluid, with each one of the multiple cooling fluid flow paths extending through one of the plate pairs 1*a*, 1*b*. Each such cooling fluid flow path includes a first portion 12 extending between one of the internal fins 14 and a longitudinal edge of the pair, and a second portion 13 extending between that one of the internal fins 14 and the opposing longitudinal edge of the plate pair. A third portion of the cooling fluid flow path extends through the internal fin in the high pressure drop direction to provide fluid communication between the first portion 12 and the second portion 13. Preferably, the direction of the cooling fluid flow along that third portion of the cooling fluid flow path is counter to the direction of the heated air flow. In some, but not all, embodiments the cooling fluid flow path also includes a portion 11 located within the inlet and outlet region and extending from the inlet 4 for the cooling fluid to the first portion 12, as well as another portion 11 located within the inlet and outlet region and extending from the second portion 13 to the outlet 5 for the cooling fluid.

Figure 6:
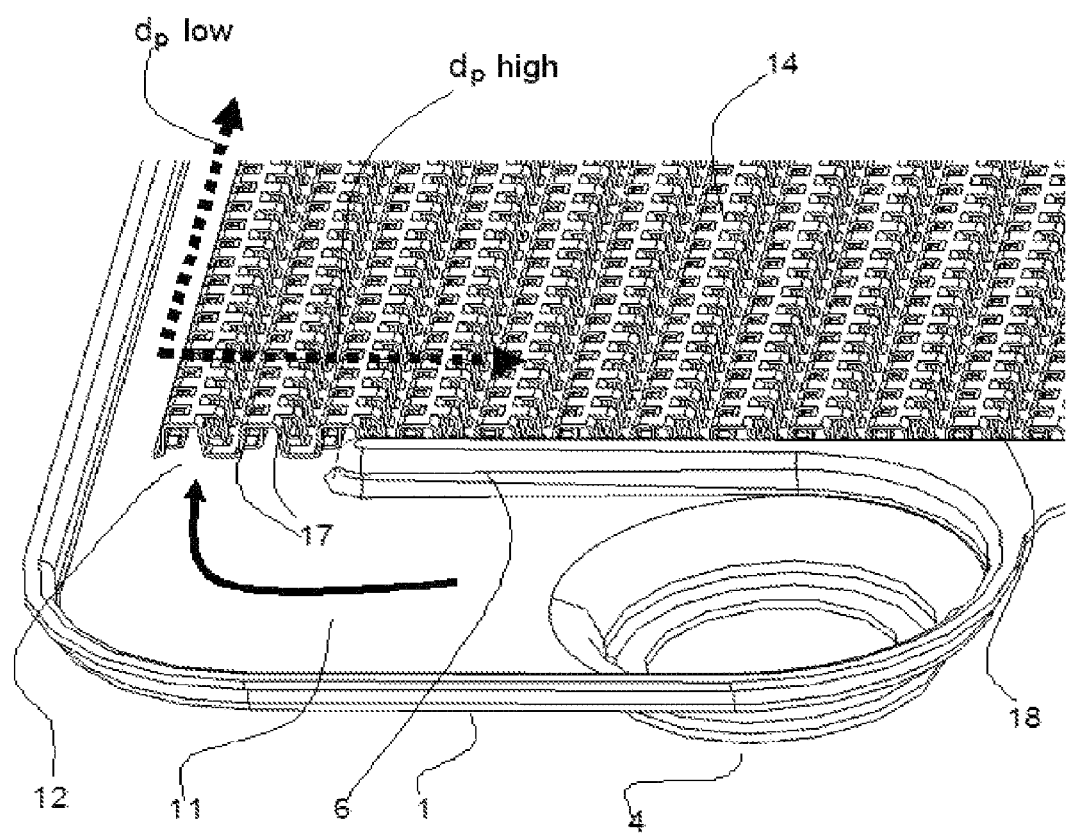
FIG. 6 shows a perspective view of a plate part with an internal fin.

FIG. 6 shows, in a section, a perspective view of the corrugated internal fin 14 which is located in the plate 1. Some details of the corrugated internal fin 14 can be seen. The direction in which the corrugation runs in the heat exchanger is the lateral direction thereof, that is to say the direction of the significantly higher pressure loss dp. In the corrugation edges 17 there are breakthroughs or cutouts 18 offset alternately to the left and to the right when viewed in the direction of said corrugation edge 17. The width of the ducts 12, 13 is determined by the distal end of the flow barrier 6 and the longitudinal edge of the plate. As is also shown by FIG. 6, a narrow strip of the duct 12 is completely free.

In embodiments according to the invention (not shown) the entire duct 12, 13 is of free design. In other embodiments (not shown) the longitudinal edge of the internal fin 14 extends directly to the longitudinal edge of the plates 1, with the result that the entire duct cross section is occupied by a section of the internal fin 14. The function of the ducts 12, 13 is retained because the aforementioned section points in the direction of the low pressure loss dp which corresponds to the direction of the duct. There is also the possibility of covering the cross section of the one duct completely with part of the internal fin 14 and leaving the other duct completely free.

Figure 2:
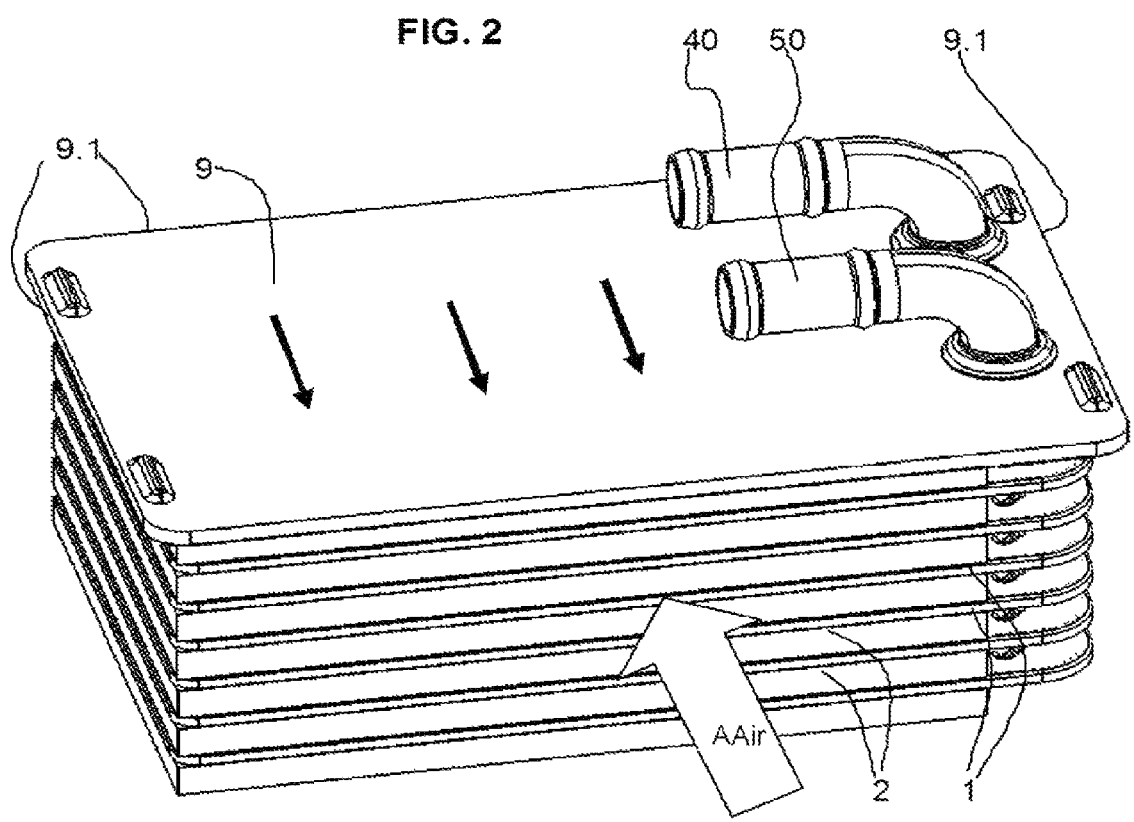
FIG. 2 shows a similarly perspective view with a cover plate on the stack of plate pairs and fins.
Figure 7:
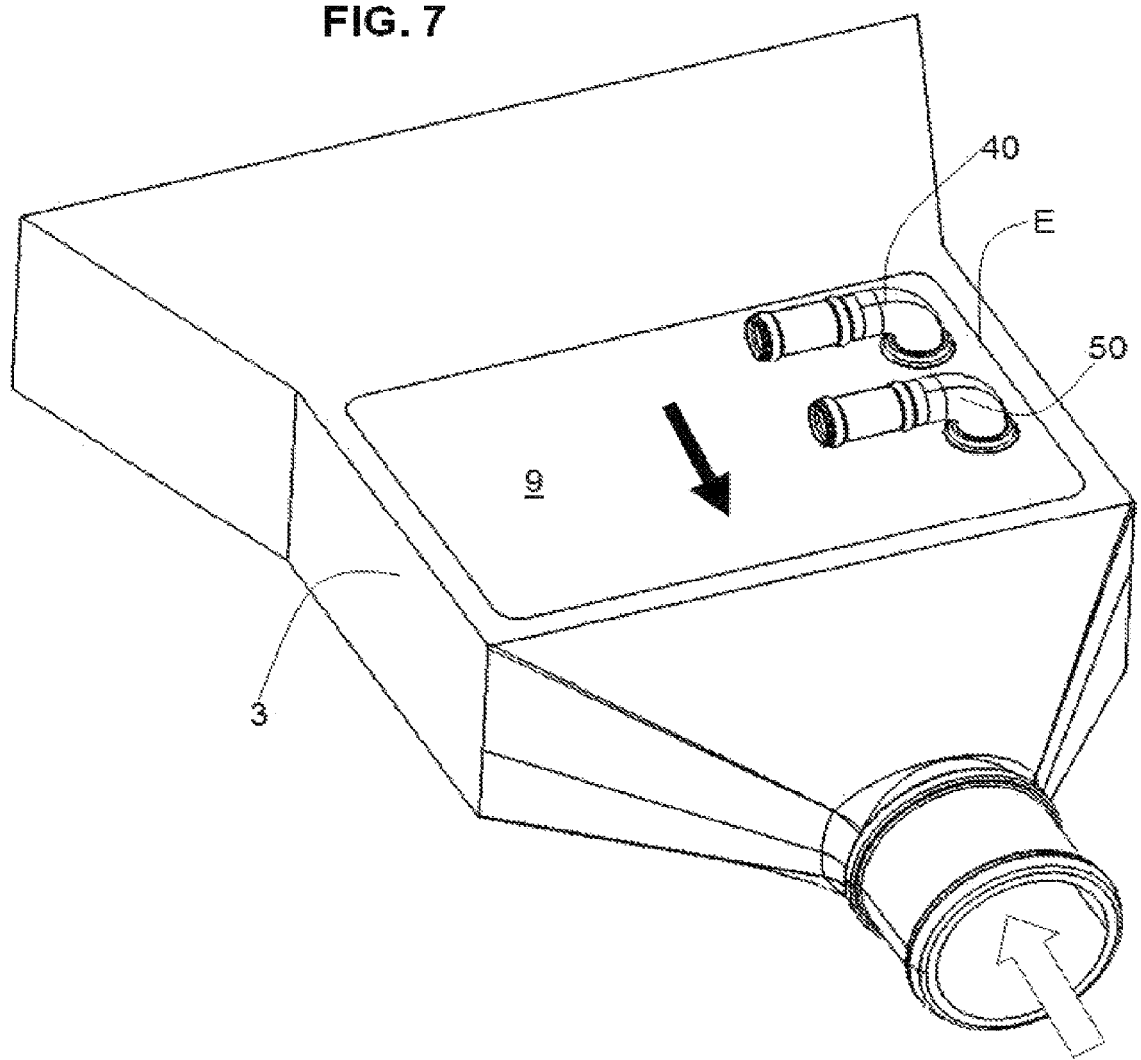
FIG. 7 shows a view of the heat exchanger in a suitable housing.

As is also the case in known heat exchangers, the compressed charge air AAir to be cooled flows through an opening into a housing 3 in which the aforementioned stack made of plate pairs 1*a*, 1*b* and fins 2 (not illustrated in more detail) are located (FIG. 7). The housing 3 can be the intake manifold of an internal combustion engine. According to the proposal, the charge air then flows through the corrugated fins 2 in countercurrent with respect to the fluid flowing in the plate pairs, and in the process it is cooled extremely efficiently. The direction of flow of the charge air is, also according to the proposal, provided in the direction of the common edge E at which the inlet 4 and the outlet 5 for the fluid are located, or in the exemplary embodiment in the direction of the lateral edges of the plates 1. As a result, the cooled charge air leaves the heat exchanger through another opening in the housing 3 in order to be available for charging the internal combustion engine (not shown). The protruding edge 9.1, of the cover plate 9 which can be seen in FIG. 2 and which terminates the stack and is connected metallically thereto, for example, can be used in a known fashion to attach the plate stack in the housing 3 and therefore serves as a closure of an assembly opening in the housing 3.

Figure 8:
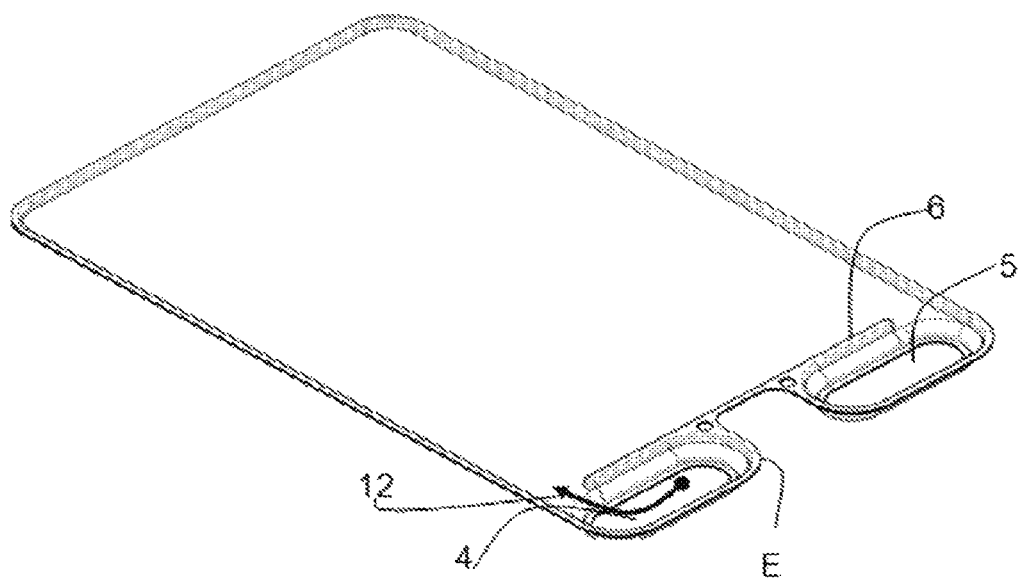
FIGS. 8 and 9 show modified plate configurations.
Figure 9:
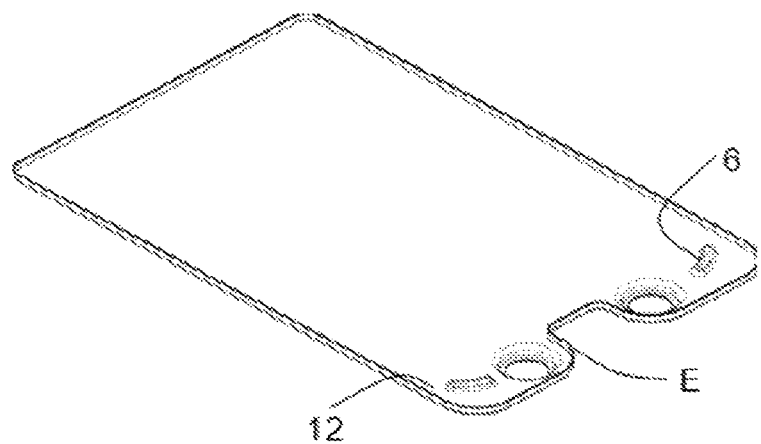

FIG. 8 shows a plate 1 with elongate holes as inlets and outlets 4, 5. The flow paths 11 have been virtually integrated into the elongate holes since there to a certain extent a flow guide is formed in the direction of the common edge E, as is also the case with the flow paths of the other exemplary embodiments. In embodiments which are not shown, the inlets and outlet 4, 5 have other different hole shapes. These may also include hole shapes which are configured asymmetrically. FIG. 9 in turn shows round plate holes 4, 5 but modified flow barriers 6.

Figure 10A:
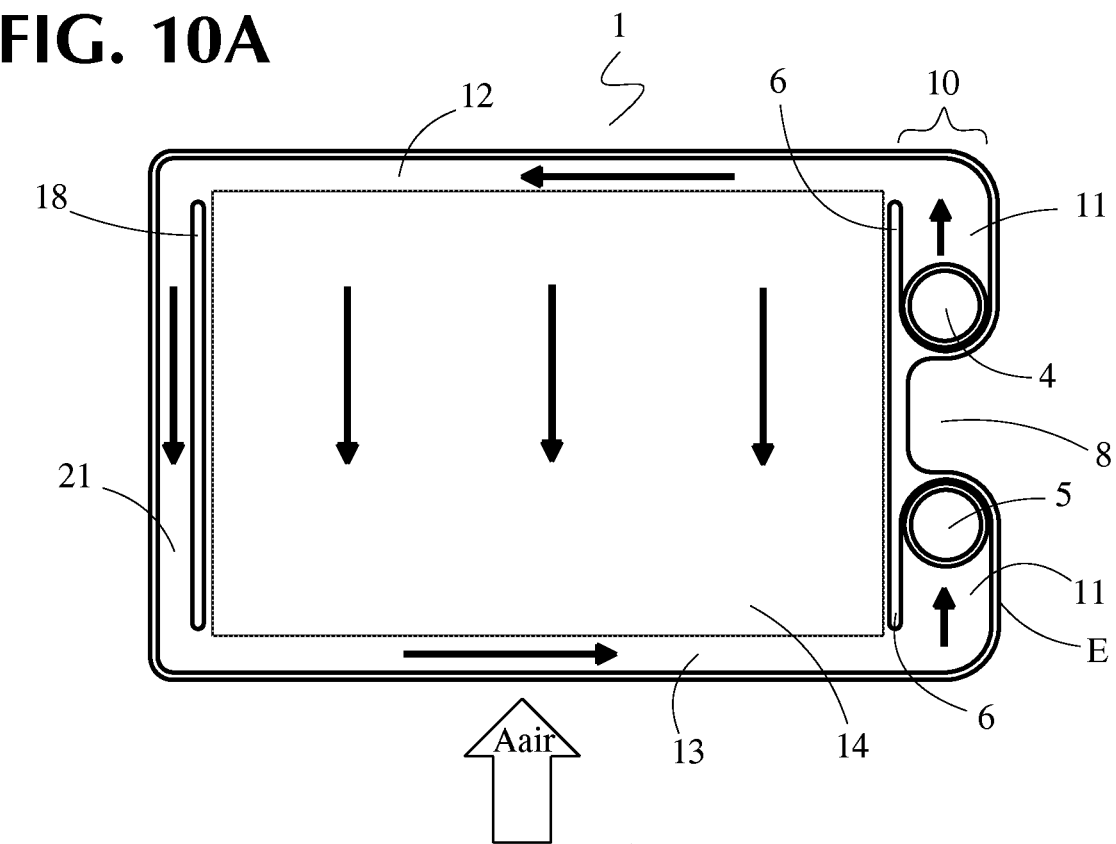
FIGS. 10A-10D show a plate of a plate pair according to additional embodiments.

FIGS. 10A-10D show several variations of a plate 1 of another embodiment, wherein a bypass channel 21 is incorporated into each one of the plate pairs 1a, 1b. As can be seen in FIG. 10A, the bypass 21 allows a portion of the cooling fluid passing through the plate pair 1a, 1b between the cooling fluid inlet 4 and the cooling fluid outlet 5 to bypass the corrugated internal fin 14 along a lateral edge of the plates 1. A flow barrier 18 is provided in order to provide a fluid separation between the heat transfer region, characterized for example by the corrugated internal fin 14, and the bypass channel 21. The flow barrier 18 can be constructed in a similar fashion as the flow barrier 6, such as by beads formed into the plates 1.

In such an embodiment, the cooling fluid flow path through the plate pair 1a, 1b is thereby modified to add a fourth portion (characterized by the bypass channel 21) arranged between the internal fin 14 and a lateral edge of the plates 1. The fourth portion 21 is fluidly connected to the first portion 12 of the cooling fluid flow path, so that the cooling fluid flowing along the cooling fluid flow path is directed through either the third portion or the fourth portion.

Heat transfer between the charge air and that portion of the cooling fluid which passes through the bypass channel 21 is intentionally inhibited, for example through the absence of any heat transfer enhancing features within the bypass channel 21, so that the portion of the cooling fluid passing through the bypass channel 21 is essentially unchanged in temperature. Alternatively or in addition, the transfer of heat between the charge air and the portion of the cooling fluid passing through the bypass channel 21 can be inhibited by blocking or impeding the flow of charge air through those portion of the air flow passages directly adjacent the bypass channel 21, for example by way of formed features of the edges of the plates 1. The bypass section 21 thereby allows a portion of the cooling fluid to bypass the heat exchange section of the plate pair 1a, 1b, characterized by that section of the plate pair that is occupied by the corrugated internal fin 14.

As seen in FIG. 10A, the bypass channel 21 can be fluidly connected to the channel 13 so that the portion of the cooling fluid passing through the bypass channel 21 can discharge directly into the channel 13. The momentum of the cooling fluid passing through the bypass channel 21 will cause it to be directed towards the longitudinal plate edge of the channel 13. This has the beneficial effect of allowing the relatively unheated cooling fluid to cool the leading edges of the plates 1 onto which the heated charge air directly impinges. The inventors have found that such a cooling effect helps to reduce the metal temperature of these leading plate edges, thereby avoiding an undesirable boiling of the cooling fluid which might otherwise result.

Figure 10B:
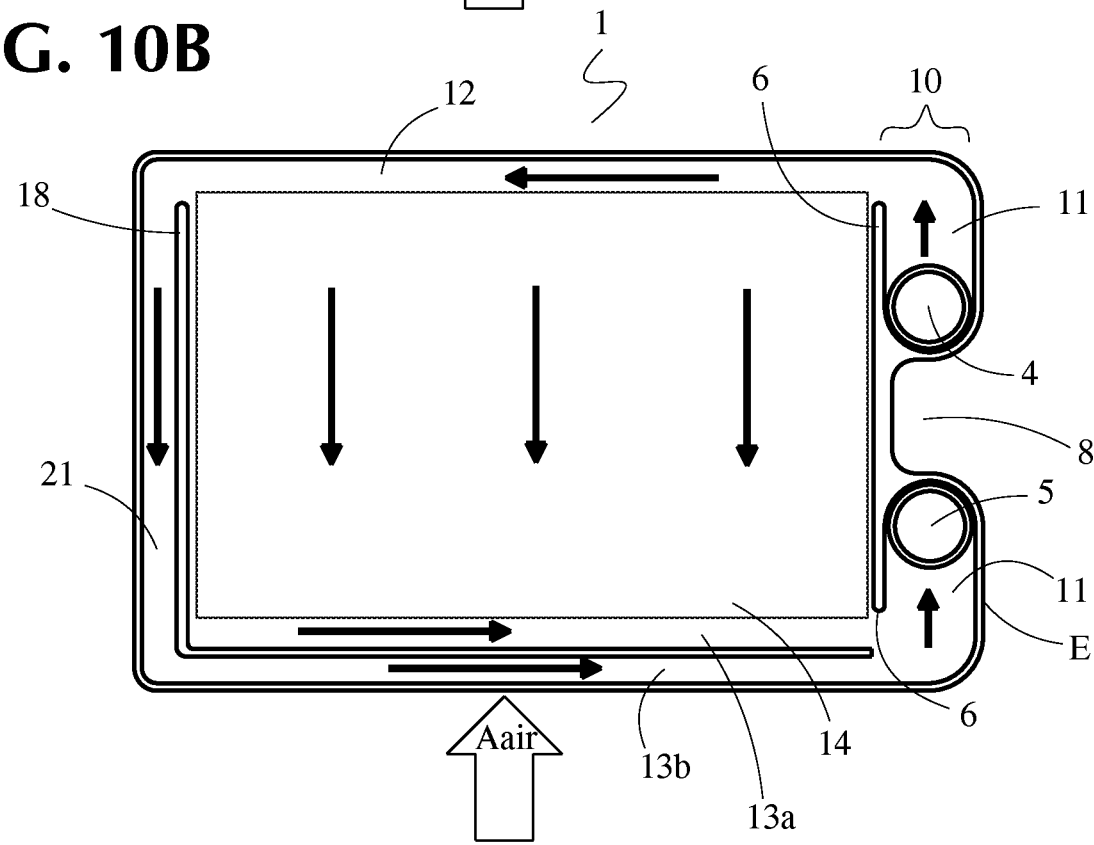

In the alternate plate design of FIG. 10B, the channel 13 is divided into a first portion 13a and a second portion 13b by another flow barrier 19. The flow barrier 19 can be, but need not necessarily be, joined to the flow barrier 18. The flow barrier 19 maintains the separation within the flow channel 13 of the portion of the cooling fluid that passed through the bypass channel 21 and the portion of the cooling fluid that passed through the heat exchange section 14. As a result, the cooling effect on the leading edges of the plates 1 can be enhanced, and the risk of cooling fluid boiling can be further reduced. The flow channel portion 13b thereby defines a fifth portion of the cooling fluid flow channels that is connected in series to the fourth portion defined by the bypass channel 21.

Figure 10C:
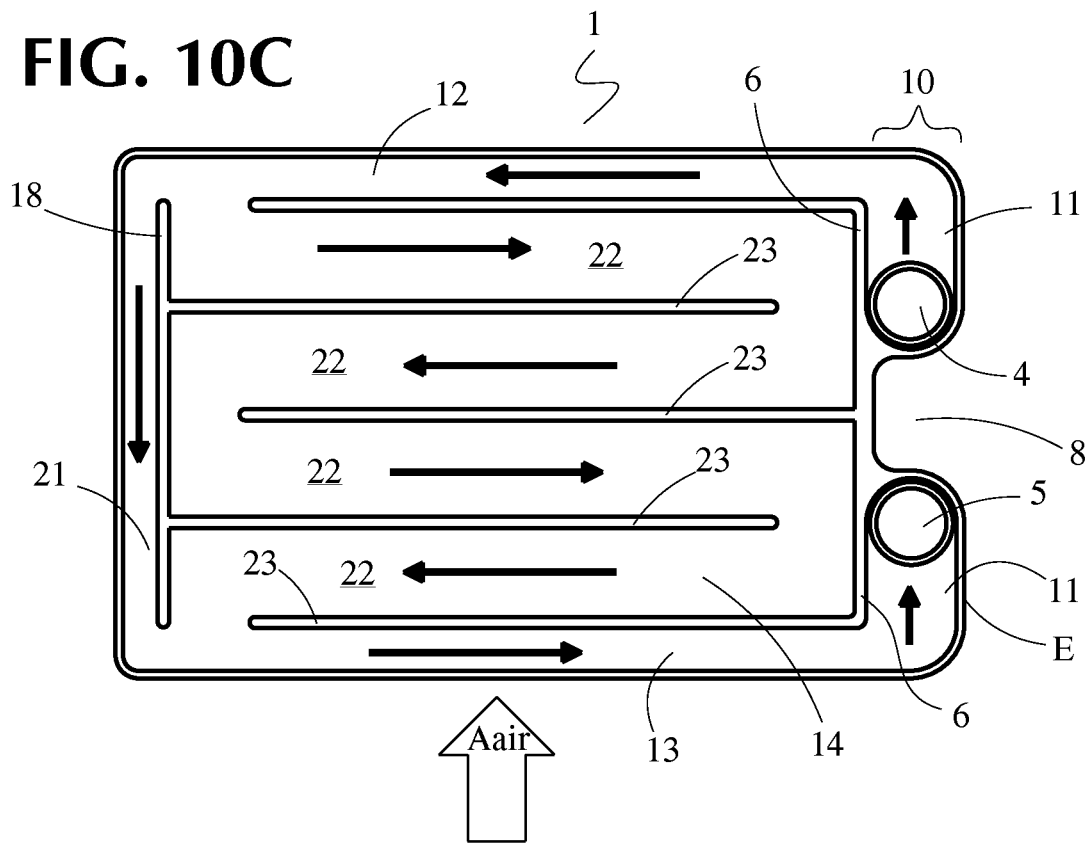
Figure 10D:
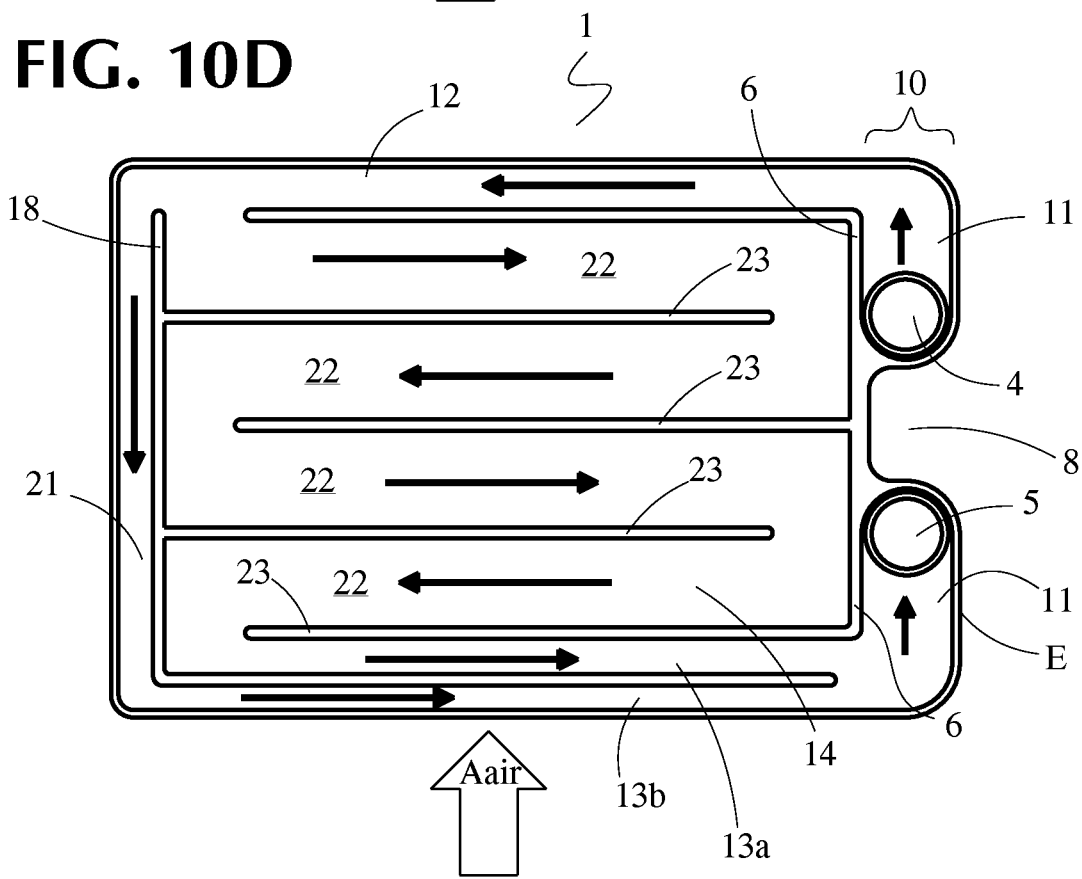

FIGS. 10C and 10D depict variations of the plates 1 of FIGS. 10A and 10B, respectively. In the plates 1 of FIGS. 10C and 10D, the corrugated internal fin 14 defining the heat exchange section of the plate pair has been replaced by a successively arranged series of flow passages 22 through which that portion of the cooling fluid flow that is not directed through the bypass channel 21 is directed. The series of flow passages 22 together constitute a heat exchange section 14' of the plate pair. Each of the flow passages 22 extend in a direction that is parallel to the longitudinal edges of the plates 1 between the flow barrier 6 and the flow barrier 18. The cooling fluid is directed through the series of flow passages 22 in a counter-cross-flow direction to the flow of heated air through the heat exchanger. Additional flow barriers 23 are arranged between adjacent ones of the flow channels 22 in order to define the flow channels 22, with the flow barriers 23 alternatingly extending from the flow barrier 6 and from the flow barrier 18. One of those flow barriers 23 also serves to separate the initial one of the flow passages 22 from the duct 12, while another one of those flow barriers 23 also serves to separate the terminal one of the flow passages 22 from the duct 13.

A heat exchanger built using the plates 1 as described in FIGS. 10A-D can be particular desirable for cooling a flow of heated air (such as for example compressed charge air for an internal combustion engine) using a flow of liquid cooling fluid with high heat exchange efficiency without the increased risk of causing undesirable boiling of the cooling fluid. In at least one embodiment of a method of cooling such a flow of heated air, a flow of heated air Aair (for example, compressed charge air for an internal combustion engine) is directed through the air flow passages of the heat exchanger in an air flow direction. Simultaneously, a flow of cooling fluid is directed into the heat exchanger and is distributed among the plate pairs 1a, 1b of the heat exchanger through coolant inlets 4 of the plate pairs. Within each one of the plates pairs 1a, 1b, the cooling fluid is first directed through a first duct 12 in a direction that is perpendicular to the air flow direction. A first portion of the cooling fluid is then directed from the first duct 12 through a heat exchange section 14, 14'. Within the heat exchange section 14, 14', the cooling fluid is directed in a direction that is overall counter to the air flow direction, such as in a counter-flow or a cross-counter-flow direction. Heat is transferred from the flow of heated air to that first portion of the cooling fluid as it flows through the heat exchange section 14, 14'. Simultaneously, a second portion of the cooling fluid is directed from the first duct 12 through a bypass section 21 of the plate pair, also in a direction that is counter to the air flow direction. The transfer of heat between the flow of heated air and the second portion of the cooling fluid is inhibited within the bypass section, so that the second portion of the cooling fluid exits the bypass section at a lower temperature than the first portion exits the heat exchange section. The first and the second portions are subsequently directed through a second duct 13 in a direction that is again perpendicular to the air flow direction.

In some embodiments, such as ones using plates 1 such as are depicted in FIG. 10A and FIG. 10C, the second duct 13 is a single duct through which the first portion of the cooing fluid and the second portion of the cooling fluid both flow. In such an embodiment, some mixing of the first and second portions of the cooling fluid can occur within the second duct 13. In other embodiments, such as for example ones using plates 1 as are depicted in FIG. 10B and FIG. 10D, the first portion of the cooling fluid and the second portion of the cooling fluid are separated within the second duct 13 and mixing of the two portions within that duct 13 is prevented. The first portion of the cooling fluid can be directed through a portion 13a of the second duct 13 while the second portion of the cooling fluid can be directed through a portion 13b of the second duct 13. The portion 13b can advantageously be arranged to be upstream of the portion 13a with respect to the direction of the heated air flow through the heat exchanger, so that the portion of the flow of cooling fluid that passed through the bypass duct 21 (and which is, consequently, at a lower temperature) can sufficiently depress the temperature of the plates surfaces that are directly impacted by the hottest air in order to prevent any boiling of the cooling fluid.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A heat exchanger comprising:
   a plurality of stacked plate pairs having air flow passages arranged between adjacent ones of the plurality of stacked plate pairs, the air flow passages extending between a set of first longitudinal edges of the plurality of stacked plate pairs and an opposing set of second longitudinal edges of the plurality of stacked plate pairs to define an air flow direction through the heat exchanger perpendicular to the first and second longitudinal edges;
   an inlet and outlet region for cooling fluid, each of the plurality of stacked plate pairs having an inlet for cooling fluid and an outlet for cooling fluid arranged within the inlet and outlet region and aligned with the air flow direction;
   a plurality of corrugated internal fins, each being located within one of the plurality of stacked plate pairs;
   a first plurality of flow barriers and a second plurality of flow barriers, each of the first plurality of flow barriers and each of the second plurality of flow barriers being constructed by beads of each of the plurality of stacked plate pairs, the first plurality of flow barriers being arranged between the inlet and outlet region for cooling fluid and the plurality of corrugated internal fins; and
   a plurality of cooling fluid flow paths, each of the plurality of cooling fluid flow paths extending through one of the plurality of stacked plate pairs between the inlet for cooling fluid and the outlet for cooling fluid and each including a first portion extending between one of the plurality of corrugated internal fins and one of the set of first longitudinal edges, a second portion extending between the one of the plurality of corrugated internal fins and one of the set of second longitudinal edges, and a third portion extending through the one of the plurality of corrugated internal fins to provide fluid communication between the first portion and the second portion, wherein a cooling fluid flow direction along the third portion is at least partially defined as being counter to the air flow direction,
   wherein each one of the plurality of cooling fluid flow paths further includes a fourth portion arranged between the one of the plurality of corrugated internal fins and one of a plurality of lateral edges of the plurality of stacked plate pairs the one of the plurality of lateral edges being perpendicular to at least the one of the set of first longitudinal edges and the one of the set of second longitudinal edges, the fourth portion extending between the first portion and the second portion, such that cooling fluid flows from the first portion through either the third portion or the fourth portion to the second portion, and such that at a least a portion of the second portion is at a lower temperature than a portion of the third portion, and
   wherein the second plurality of flow barriers at least partially bounds the fourth portions of the plurality of cooling fluid flow paths.

2. The heat exchanger of claim 1, wherein the inlet and outlet region for cooling fluid is at least partially bounded by lateral edges of the plate pairs perpendicular to the longitudinal edges of the plate pairs.

3. The heat exchanger of claim 1, wherein each one of the plurality of corrugated internal fins is arranged between one of the first plurality of flow barriers and one of the second plurality of flow barriers.

4. The heat exchanger of claim 1, wherein each one of the plurality of cooling fluid flow paths further includes a fifth portion fluidly connected to the fourth portion to receive cooling fluid therefrom, the fifth portion being arranged between the second portion and the one of the set of second longitudinal edges.

5. The heat exchanger of claim 4, further comprising a third plurality of flow barriers constructed by beads of each of the plurality of stacked plate pairs, the second portions of the plurality of cooling fluid flow paths being separated from the fifth portions of the plurality of cooling fluid flow paths by the third plurality of flow barriers.

6. The heat exchanger of claim 5, wherein each one of the second plurality of flow barriers is joined to one of the third plurality of flow barriers.

7. The heat exchanger of claim 1, wherein the fourth portion is fluidly connected to the second portion.

8. A method of cooling a flow of heated air, comprising:
   directing a flow of heated air through air flow passages of a heat exchanger in an air flow direction;
   directing a flow of cooling fluid into the heat exchanger and distributing the flow of cooling fluid among plate pairs of the heat exchanger through cooling fluid inlets of the plate pairs, the air flow passages being arranged between adjacent ones of the plate pairs;
   within each one of the plate pairs, directing the flow of cooling fluid through a first duct in a direction perpendicular to the air flow direction;
   within each one of the plate pairs, directing a first portion of the flow of cooling fluid from the first duct through a heat exchange section in a direction counter to the air flow direction;
   transferring heat from the flow of heated air to the first portion of the flow of cooling fluid as the first portion of the flow of cooling fluid flows through the heat exchange section of each one of of the plate pairs;
   within each of the plate pairs, directing a second portion of the flow of cooling fluid from the first duct through a bypass section in a direction counter to the air flow direction, the transfer of heat between the flow of heated air and the second portion of the flow of cooling fluid being inhibited within the bypass section so that the second portion of the flow of cooling fluid exits the bypass section at a lower temperature than the first portion of the flow of cooling fluid exits the heat exchange section;

within each of the plate pairs, directing the first portion of the flow of cooling fluid through a second duct in a direction perpendicular to the air flow direction after directing the first portion of the flow of cooling fluid through the heat exchange section;

within each of the plate pairs, directing the second portion of the flow of cooling fluid through the second duct in a direction perpendicular to the air flow direction after directing the second portion of the flow of cooling fluid through the bypass section; and removing the flow of cooling fluid from the heat exchanger through cooling fluid outlets of the plate pairs, wherein the steps of directing the first portion of the flow of cooling fluid through the second duct and directing the second portion of the flow of cooling fluid through the second duct includes arranging the second portion upstream of the first portion with respect to the air flow direction.

9. The method of claim 8, wherein mixing of the first portion of the flow of cooling fluid flow with the second portion of the flow of cooling flow within the second duct is prevented.

10. The method of claim 8, wherein directing the first portion of the flow of cooling fluid flow through a heat exchange section includes passing the first portion of the flow of cooling fluid flow through a corrugated internal fin.

11. The method of claim 8, wherein directing the first portion of the flow of cooling fluid flow through a heat exchange section includes passing the first portion of the flow of cooling fluid flow through a successively arranged series of flow passages, each of the successively arranged series of flow passages extending in a direction perpendicular to the air flow direction.

12. A heat exchanger comprising:
a plurality of stacked plate pairs defining air flow passages between adjacent ones of the plurality of stacked plate pairs, defining an air flow direction through the heat exchanger, and defining cooling fluid flow paths, each cooling fluid flow path extending through one of the plurality of stacked plate pairs, at least one of the plurality of stacked plate pairs comprising:
an inlet for a cooling fluid and an outlet for the cooling fluid, each being arranged within an inlet and outlet region;
a heat transfer region having an inlet edge and an outlet edge opposite the inlet edge;
a bypass channel located outside of the heat transfer region;
a first duct defined partially by the inlet edge of the heat transfer region, the first duct extending outside of the heat transfer region from the inlet and outlet region to the bypass channel;
a second duct defined partially by the outlet edge of the heat transfer region, the second duct extending outside of the heat transfer region from the bypass channel to the inlet and outlet region; and
a first flow barrier and a second flow barrier, the first flow barrier being arranged between the inlet and outlet region and the heat transfer region, and the second flow barrier being arranged between the bypass channel and the heat transfer region and providing fluid separation between the heat transfer region and the bypass channel,
wherein the first duct is fluidly connected to the second duct partially through the heat transfer region,
wherein the first duct is fluidly connected to the second duct partially through the bypass channel, and
wherein the heat transfer region is defined by at least one change in direction of the cooling fluid flow path.

13. The heat exchanger of claim 12, wherein the bypass channel, the first duct, and the second duct, each have an absence of any heat transfer enhancing features to inhibit heat transfer between the at least one of the air flow passages and the at least one of the cooling fluid flow paths.

14. The heat exchanger of claim 12, wherein the bypass channel, the first duct, the second duct, and the inlet and outlet region together extend around the periphery of the heat transfer region.

15. The heat exchanger of claim 12, wherein the cooling fluid flow path has a lower temperature at the end of the bypass channel than at the end of the heat transfer region.

16. The heat exchanger of claim 12, wherein the heat transfer region contains a corrugated internal fin.

17. The heat exchanger of claim 12, wherein the air flow direction is parallel and concurrent to a first lateral direction of the plurality of stacked plate pairs and perpendicular to a first longitudinal direction of the plurality of stacked plate pairs.

18. The heat exchanger of claim 12, wherein at least a portion of the bypass channel has a lower temperature than at least a portion of the second duct.

* * * * *